United States Patent [19]

Evans

[11] 3,848,675

[45] Nov. 19, 1974

[54] FOAM-PRODUCING APPARATUS

[75] Inventor: John L. Evans, Blackwater, near Camberley, England

[73] Assignee: Chubb Fire Security Limited, Middlesex, England

[22] Filed: Nov. 5, 1973

[21] Appl. No.: 412,639

Related U.S. Application Data

[63] Continuation-in-part of Ser. No. 242,317, April 10, 1972, abandoned.

[30] Foreign Application Priority Data

Apr. 14, 1971  Great Britain ...................... 9437/71

[52] U.S. Cl. ................................. 169/15, 239/204
[51] Int. Cl. ............................................ A62c 35/44
[58] Field of Search ........ 169/14, 15; 239/203, 204, 239/428.5, 518

[56] References Cited
UNITED STATES PATENTS 2,513,047  6/1950  Pfeiffer ............................... 239/204
2,564,060  8/1951  Gettins ............................ 239/514 X Primary Examiner—M. Henson Wood, Jr.
Assistant Examiner—Michael Mar
Attorney, Agent, or Firm—Larson, Taylor and Hinds

[57] ABSTRACT

For a foam sprinkler installation, a foam-producing apparatus includes a housing which is recessed into the ground or floor and a foam generator mounted for movement relative to the housing between a lower recessed position and an upper position in which the delivery end of the foam generator and air-entraining apertures in the body of the foam generator are above the level of the ground or floor, the foam generator being automatically raised to its upper position, when a foaming agent solution is delivered to the apparatus, by the pressure of the solution.

8 Claims, 5 Drawing Figures

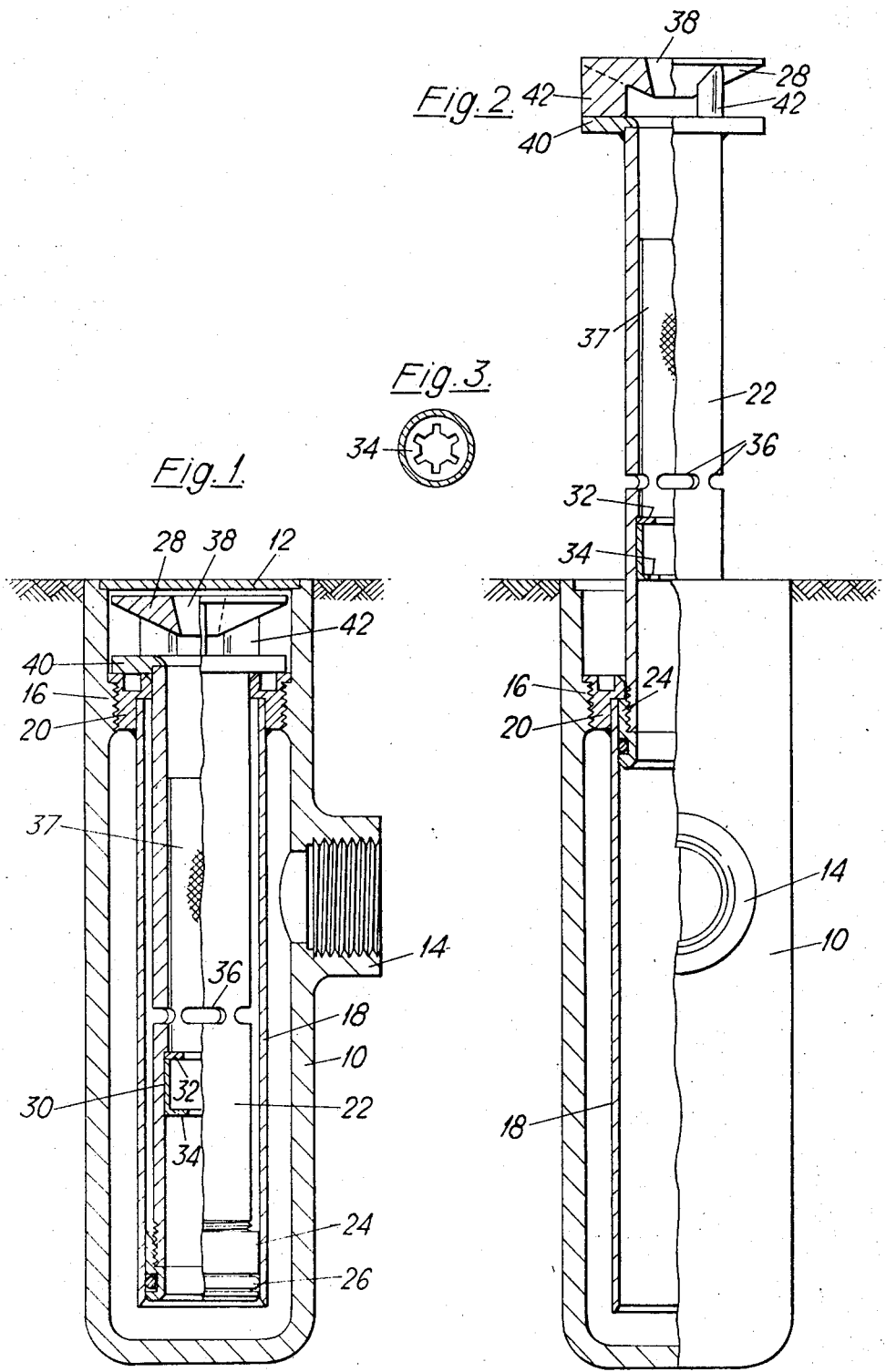

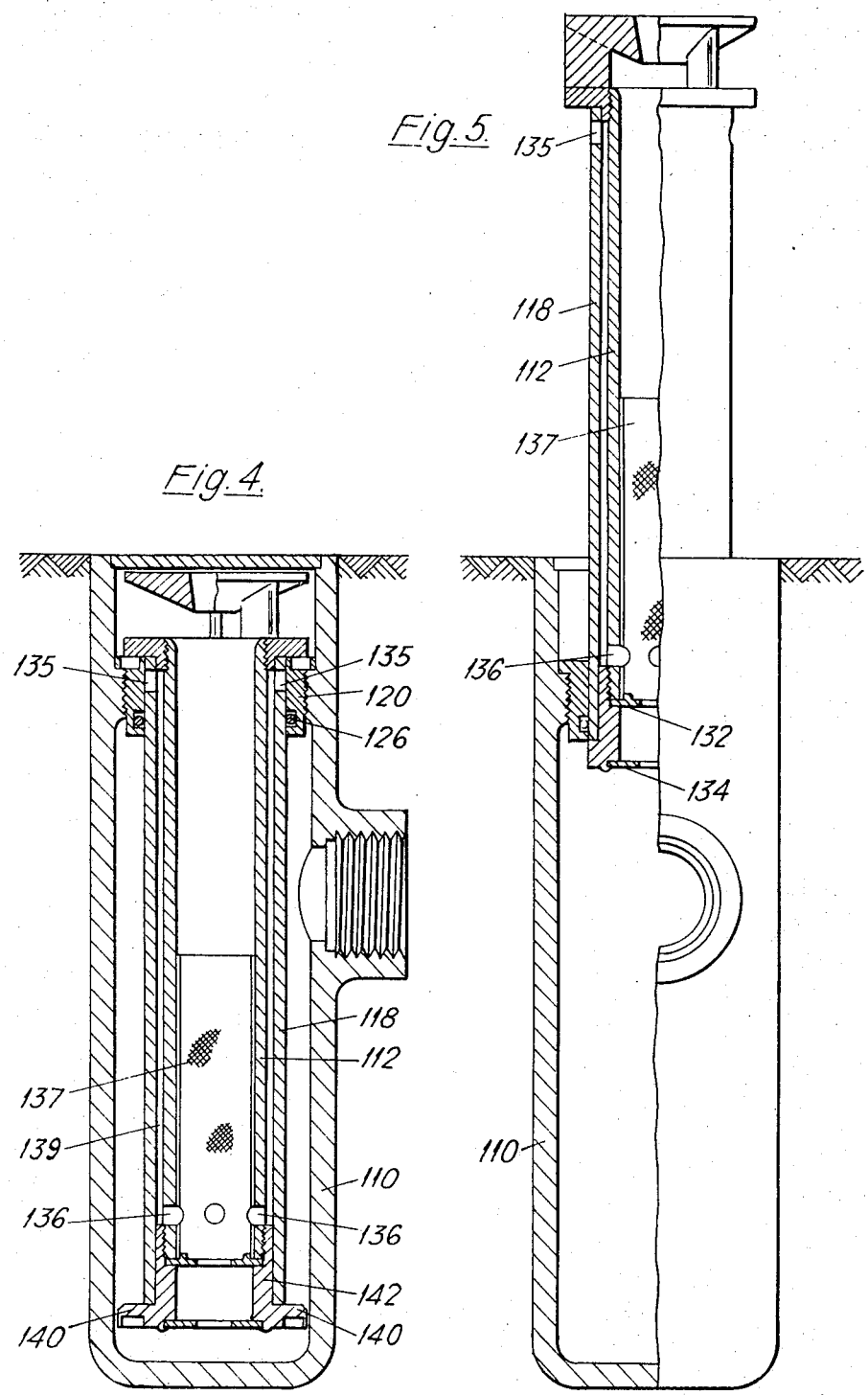

FOAM-PRODUCING APPARATUS

This application is a continuation-in-part of Ser. No. 242,317, filed Apr. 10, 1972, now abandoned.

This invention relates to apparatus for producing and distributing fire-fighting foam and is particularly concerned with foam-producing apparatus which can be installed at a number of outlet points in a supply system for a foaming agent to provide fire protection over a substantial area, for example in a building or ship. Mechanical foam for fire-extinguishing purposes is normally produced from a solution of a foaming agent flowing under substantial pressure through a jet-forming device and entraining air, the resultant mixture of liquid and air travelling onwards through a foam tube which terminates in a discharge nozzle from which the foam is thrown. In a multiple-outlet foam sprinkler system the foam producers are generally installed at an elevated position within the area to be protected and are directed downwards so as to distribute foam in a uniform pattern over the floor area. This arrangement is satisfactory in cases where the floor area is relatively unobstructed but in cases where there are obstructions preventing foam from the elevated foam producers from reaching the floor area it may be desirable to replace or augment the elevated foam producers by foam producers at floor level arranged to project foam upwards and outwards and thus to spread foam beneath the obstruction. One example of a building in which such obstructions occur is a large aircraft hangar because the very large aerofoil areas of modern aircraft cause large areas of the hangar floor to be out of direct range of elevated foam producers. The floor level foam producers are preferably recessed in the ground so that they do not cause any obstruction to machine or personnel.

There is, however, a risk that spilled liquid fuel may run into the recessed foam producers and may be injected into the foam with the solution of foaming agent, in which case the foam distributors could spread the fire instead of extinguishing it.

Foam-producing apparatus according to the present invention comprises: a foam generator having an inlet for receiving a solution of a foaming agent and a delivery end through which foam is expelled and defining a path between the inlet and the delivery end, a jet head between the said inlet and the delivery end for breaking a jet of the said solution into a spray, a turbulence generator located downstream of the jet head and air-entraining means comprising air-intake apertures and opening into the path of the said solution between the jet head and the turbulence generator for introducing air into the path of the spray; a housing for the foam generator, the housing in use being recessed into the ground, the foam generator being mounted for movement relative to the housing between a lower position in which it does not extend substantially above the housing and an upper position in which the delivery end and the air-intake apertures of the foam generator are above the level of the housing and to which it is automatically lifted, when the foaming agent solution is delivered to the said inlet, by the pressure of the solution. In the above statement, the reference to "the ground" is intended to include any internal floor surface (not necessarily a ground floor surface) as well as an external ground surface.

In the operational position, the air-intake apertures are raised above the level of any spilled fuel on the floor of the area to be protected. In the preferred form of apparatus embodying the invention, the foam generator comprises a tube having an inlet end for the foaming agent solution and a foam delivery end, this tube being surrounded by a further tube so as to leave a longitudinal space between the two tubes, the tubes being fixed so that they slide together within the housing; the air-entraining means comprises an aperture located in the wall of the inner tube towards the lower end of that tube and an aperture formed in the wall of the surrounding tube towards the other end thereof, the apertures communicating through the said longitudinal space. Such an arrangement permits the air-intake apertures in the surrounding tube to be raised higher above the ground than is possible when the interior of the foam generator tube is directly exposed to the atmosphere through apertures in the foam generator tube itself. In addition, the use of inner and outer tubes permits the apertures in the inner foam generator tube to be placed lower in that tube than would otherwise be possible and this increases the length of the tube available for foam generation and results in foam of improved quality.

In order that the invention may be better understood, one example will now be described with reference to the accompanying drawings, in which:

FIG. 1 is a side elevation of the foam-producing apparatus, partly in section, with the foam generator in its lower position;

FIG. 2 is also a side elevation of the foam-producing apparatus but shows the foam generator in its raised position;

FIG. 3 shows the lower plate of the jet head in the foam generator;

FIG. 4 is a side elevation of an alternative form of foam-producing apparatus embodying the invention, with the foam generator in its lower position; and FIG. 5 is a side elevation of the foam-producing apparatus of FIG. 4 with the foam generator in its raised position.

In the foam-producing apparatus shown in FIGS. 1-3, the outer casing 10 is a metal tube open at its top end and closed at its bottom end. As shown in the drawings, it is recessed in the ground so that its top surface is at ground level. At its upper end its internal surface is cut back to provide a seat for a cap 12. The tube 10 is formed with an inlet port 14 for the entry of a solution of the foaming agent and is threaded internally at 16.

A fixed intermediate tube 18 is mounted within the tube 10. The tube 18 is open at its top and bottom ends and has a flange 20 fixed to its top end, the flange carrying an external thread which engages with the internal thread on the tube 10 when the tube 18 is mounted in the latter.

Inside the tube 18 is the axially movable foam-generating tube 22, shown in its lower position in FIG. 1 and in its raised position in FIG. 2. The tube 22 is guided within the tube 18 by means of a piston sleeve 24 which is screwed on to the tube 22 and in which is mounted a sealing ring 26, and by the engagement of the outer surface at its upper end with the internal surface of the flange 20, the inner diameter of which is slightly less than the inner diameter of the intermediate tube 18.

Movement of the tube 22 is brought about by the pressure of the solution of foaming agent which enters the port 14. The foaming agent travels down the tube 10, in the annular space between this tube and the intermediate tube 18 and forces the tube 22 to rise. When this happens, a foam distributor 28 at the top of the foam generator pushes aside the cap 12 (FIG. 1).

The tube 22 includes a jet head 30. This consists of two apertured circular plates 32 and 34, axially spaced within the tube 22, the shape of the aperture in the plate 34 being illustrated in FIG. 3. It will be seen from FIG. 3 that slots extend outwards from the periphery of the otherwise circular aperture in plate 34. These slots are so spaced and of such dimensions that liquid passing through them impinges on the wall of plate 32 around the orifice in the latter and this has the effect of breaking up what would otherwise be a solid jet passing down the tube into a spray of droplets without substantial loss of kinetic energy.

Above the plate 32 the tube 22 is formed with air-entraining apertures 36. As shown in FIG. 2, these apertures are above the ground level when the tube 22 is in its raised position. The air entering the tube 22 through these apertures passes upwards along the tube 22 with the foaming agent. Downstream of the air-entraining apertures is a gauze liner 37 which serves as a turbulence generator or mixer tube, the purpose of which is to mix the air with the water to create the bubbles which will form the foam. In the example shown, the mixer tube 37 is extended downwards to rest on the jet head 30 and is formed with apertures in its side wall in register with the apertures 36. Without the turbulence generator, an extremely long tube would have to be provided between the air-entraining apertures and the delivery end of the foam generator to achieve sufficient mixing of the air and foaming agent solution.

In this way, the solution is developed into a foam which, at the top of the tube, encounters the distributor 28. Some of the foam passes through the central aperture 38 and the remainder strikes the oblique surface of the inverted cone and is thrown upwards and outwards around the foam generator. The distributor 28 is supported on the flange 40 of the tube 22 by three fins 42.

The level to which the tube 22 rises is limited by the engagement of the sleeve 24 with the inner portion of the flange 20. At this level, the apertures 36 are clear of the maximum anticipated level of fuel spillage in a fire and therefore there is no risk of entrainment of liquid fuel into the tube 22. Moreover, the flange 20 prevents the passage of any spilled fuel into the annular space between tubes 10 and 18, through which flows the foaming agent solution.

In the arrangement shown in FIG. 4, the intermediate tube 118 is mounted for sliding movement within the housing 10. The flange 120 includes a sealing ring 126 which engages the outer surface of the tube 118. Tube 122 is fixed within the tube 118 and slides therewith between the lower position shown in FIG. 4 and the upper position shown in FIG. 5. In FIGS. 4 and 5, the air-entraining means includes apertures 135 in the tube 118, apertures 136 in the tube 122 and an annular passage 139 through which communication is established between the apertures 135 and 136. The jet head now consists of two discs 132 and 134, similar in form to the inwardly directed flanges 32 and 34 of the jet head in FIGS. 1 and 2.

By comparing the device shown in FIGS. 1 and 2 with that shown in FIGS. 4 and 5, it will be seen that the jet head is placed at the lower end of the foam generator tube in the apparatus of FIGS. 4 and 5 and the air-entraining apertures and turbulence generating tube 137 are also lower in the tube 122 than are the corresponding parts in the tube 22 of FIGS. 1 and 2. The longer tube length available for the mixing of the air and solution spray results in better foam. Moreover, the apertures 135, through which air is taken into the foam generator system, are higher above ground level than the apertures 36 in the apparatus of FIGS. 1 and 2, and they are thus raised even further above the level of spilled fuel.

The two projections 140 at the base of a short tube 142 screwed on to the bottom of the tube 122 assist in the guidance of the sliding portion of the apparatus within the housing 110. The foam liquid passes between these projections to reach the bottom of the foam generator tube.

I claim:

1. In a fire-fighting sprinkler system, foam-producing apparatus comprising:

a foam generator having an inlet for receiving a solution of a foaming agent and a delivery end through which the foam is expelled and defining a path between the said inlet and delivery end, a jet head between the inlet and the delivery end for forming the said solution into a spray, a turbulence generator located downstream of the jet head, and air-entraining means comprising air-intake apertures and opening into the path of the said solution between the jet head and the turbulence generator for introducing air into the path of the spray;

a housing for the foam generator, the housing in use being recessed into the ground;

the foam generator being mounted for movement relative to the housing between a lower position in which it does not extend substantially above the housing and an upper position in which the delivery end and the air-intake apertures of the foam generator are above the level of the housing and to which the foam generator is automatically lifted, when the foaming agent solution is delivered to the solution-receiving inlet, by the pressure of the solution.

2. Apparatus as defined in claim 1, in which the foam generator is a tube and the apparatus comprises an intermediate tubular member fixed within the said housing, the foam generator tube being arranged coaxially within the said fixed tubular member for sliding movement in the latter between its lower and upper positions.

3. Foam-producing apparatus in accordance with claim 1, in which the foam generator comprises a tube including the said solution-receiving inlet, the jet head and the turbulence generator, and in which the air-entraining means comprises an air-entraining aperture formed in the said tube between the jet head and the turbulence generator and means defining a channel in communication with the said air-entraining aperture and open to the atmosphere at the air-intake aperture above the level of the said air-entraining aperture when the foam generator is in its upper position.

4. Foam-producing apparatus in accordance with claim 1, in which the foam generator comprises a first tube having an open end constituting the said solution-receiving inlet and a second tube coaxial with and surrounding the said first tube so as to leave a longitudinal space between the said first tube and the said surrounding tube, the air-entraining means including an aperture located in the wall of the said first tube towards the lower end thereof and having the air-intake aperture formed in the wall of the surrounding tube towards the upper end thereof, the apertures communicating through the said longitudinal space, the surrounding tube being fixed to the said first tube so as to slide therewith within the said housing.

5. Foam-producing apparatus as defined in claim 1, in which the said housing has a side wall comprising a port for receiving the said solution of foaming agent and in which in the lower position of the said foam generator the said port communicates with the foam-receiving inlet of the foam generator through a space between the wall of the foam generator and the side wall of the housing and an end space between the open end of the foam generator and the bottom of the housing.

6. A foam sprinkler installation having a number of foam-outlet points distributed over the ground in an area to be protected, each outlet consisting of foam-producing apparatus in accordance with claim 1, the housing of the foam-producing apparatus being recessed so that it does not project above the ground and the foam generator in its raised position extending above the ground to such an extent that the said air intake of the air-entraining means is above the level of the ground.

7. In a fire-fighting sprinkler system foam-producing apparatus comprising:
   a foam generator including a tube with an open end constituting an inlet port for the entry of a solution of foaming agent when the solution is delivered to the apparatus and with air-entraining apertures, located downstream of the inlet port, through which air enters to mix with the foam solution passing along the said tube, and having a foam distributor in the path of the foam at the downstream end of the tube;
   a housing for the foam generator tube, the housing including an outer casing which, in use, is recessed into the ground, and an intermediate tubular member fixed within the outer casing, the outer casing including an inwardly extending rim from which the intermediate tubular member is suspended, the foam generator tube being arranged coaxially within the said fixed tubular member for sliding movement;
   and means for guiding the foam generator tube, during such movement, between a lower position in which it does not extend substantially above the housing and an upper position in which a downstream part of the foam generator tube, including the said distributor and the air-entraining apertures, is above the level of the housing;
   the foam generator tube being movable from its lower position to its upper position by the pressure of the said foaming agent solution.

8. Apparatus in accordance with claim 1, in which the foam generator is a tube and the turbulence generator is a gauze liner within the tube.

* * * * *